United States Patent Office 3,058,296
Patented Oct. 16, 1962

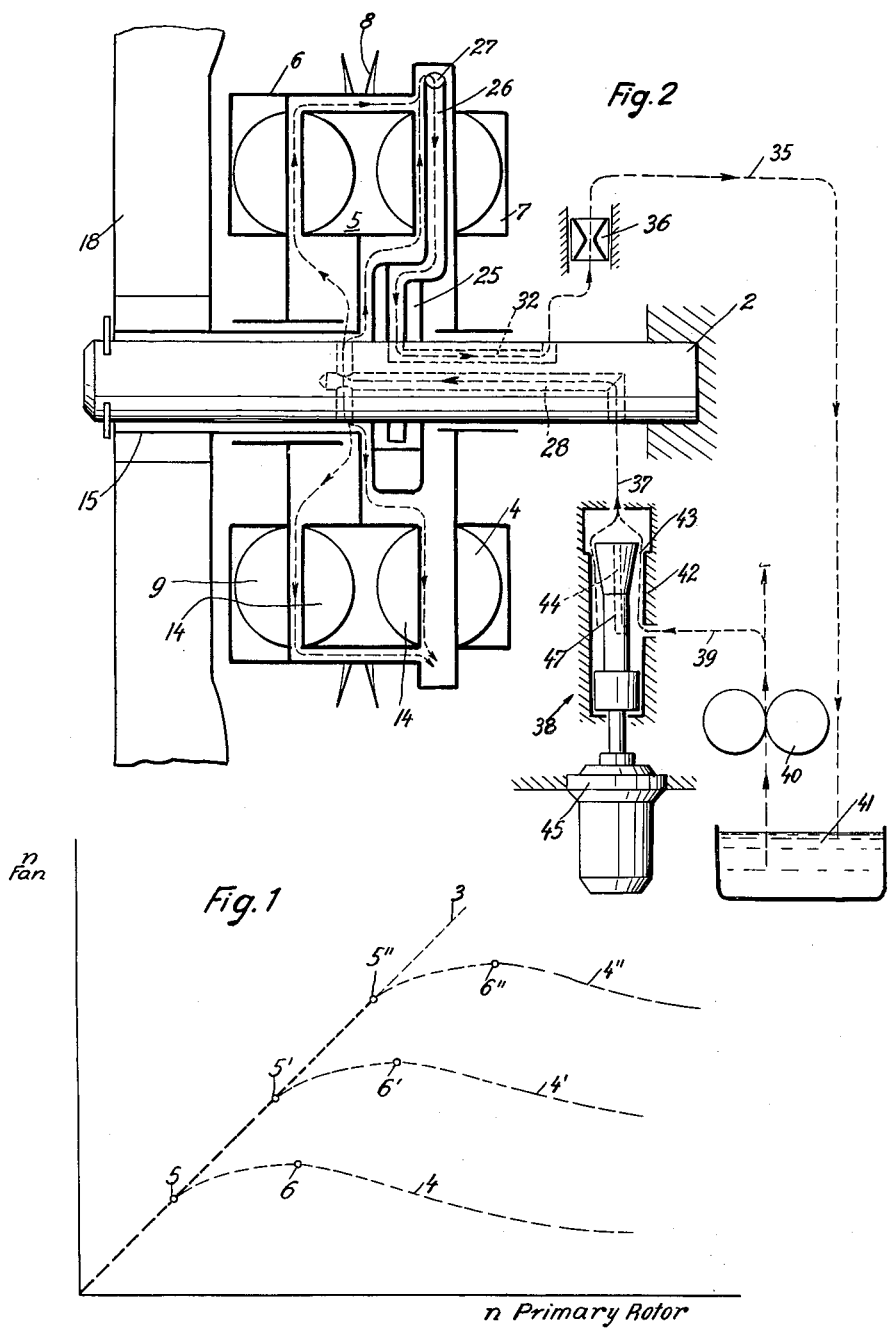

3,058,296
FAN DRIVING SYSTEM INCLUDING VARIABLE SLIP HYDRO-KINETIC COUPLING
Arthur O. Mischke, Sulzbach (Murr), and Manfred H. Burckhardt, Stuttgart, Germany, assignors to Daimler-Benz Aktiengesellschaft, Stuttgart-Unterturkheim, Germany
Filed Sept. 3, 1957, Ser. No. 681,617
Claims priority, application Germany Sept. 8, 1956
4 Claims. (Cl. 60—12)

Our invention relates to a hydrodynamic coupling, particularly to a hydrodynamic coupling for drivingly connecting an internal combustion engine, to a cooling fan, and to a driving system including such coupling.

It is the object of our invention to provide an improved hydrodynamic coupling of compact rugged structure which lends itself to cheap manufacture and easy assembly and permits of an easy control of the slippage.

More particularly, it is an object of our invention to so construct the hydrodynamic coupling that its primary rotor may be driven by a belt without necessitating the provision of a separate sheave for such purpose.

Another object is the provision of the hydrodynamic coupling with improved means for an automatic control of the slippage in dependence on the rotary speed of the primary rotor, such control being preferably effective to increase the slippage as the speed of rotation of the primary rotor increases.

Further objects of our invention will appear from the detailed description of a preferred embodiment thereof following hereinafter with reference to the drawings. It is to be understood, however, that our invention is in no way restricted to the details of such embodiment, but is capable of numerous modifications within the scope of the appended claims and that the terms and phrases used in such detailed description have been chosen for the purpose of illustrating the invention rather than that of restricting or limiting same.

In the accompanying drawings:

FIG. 1 is a graph showing the rotary speed of the secondary rotor and the fan rigidly connected therewith in dependence on the rotary speed of the primary rotor driven by the engine for different temperatures.

FIG. 2 is a diagrammatical illustration of the novel driving system and

Figure 3:
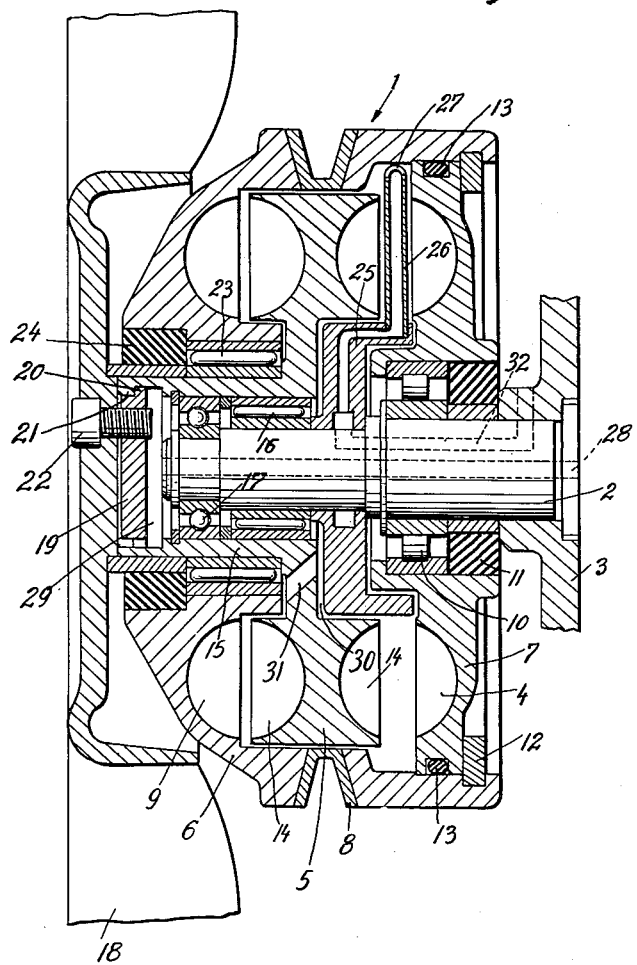
FIG. 3 is an axial section of the improved hydrodynamic coupling diagrammatically shown in FIG. 2.

The hydrodynamic clutch 1 illustrated in FIG. 3 which drivingly connects an internal combustion engine, more particularly the crank shaft or a cam shaft thereof (not shown), with a cooling fan 18 comprises a stud shaft 2, means, such as a bracket 3 fixed to a supporting frame, for mounting the stud shaft in non-rotary condition, a primary rotor 6, 7 which forms a housing encasing a secondary rotor 5 and constitutes a sheave adapted to be driven by the crank shaft or a cam shaft of the engine through the intermediary of a V-belt. Preferably, the secondary rotor 5 has a pair of sets of vanes 14 disposed symmetrically with respect to a transverse central plane of the rotor 5. The primary rotor 6, 7 has likewise a pair of sets of vanes, to wit a set 9 formed on the cup-shaped part 6 of the primary rotor and a set 4 formed on a rotor part 7 which is a cover fixed to the cup-shaped member 6 to form the housing therewith. Each set of vanes 4, 9 of the primary rotor co-operates with one of the sets of vanes 14 of the secondary rotor. The rotors are so shaped as to confine toroidal chambers each accommodating two co-operating sets of vanes.

The cover 7 has a central aperture through which the stud shaft 2 extends, an anti-friction bearing 10 being disposed therebetween. The peripheral face of the cover plate 7 is provided with a groove accommodating a sealing ring 13. A split ring 12 engaging an internal groove of the cup-shaped member 6 near the peripheral edge thereof keeps the cover plate in abutment against an internal shoulder of the cup-shaped member 6. Suitable means not shown are provided to fix the cover plate 7 against relative rotation in the cup-shaped member 6.

The secondary rotor 5 is provided with a tubular hub member 15 extending to the left with reference to FIG. 3 through a central aperture of the cup-shaped member 6 beyond the end of the stud shaft 2. The tubular hub member 15 is journaled on the stud shaft 2 by means of an anti-friction bearing 16 and in its turn carries an anti-friction bearing 23 rotatably supporting the cup-shaped member 6.

Preferably, the rotors are produced by means of an injection molding process. A sheet metal ring 8 having V-profile and preferably provided with teeth (not shown) on its outer lateral faces may be inserted in the mold for casting the cup-shaped member 6 so as to become intimately bonded with the metal thereof. In this manner the housing 6, 7 constituting the primary rotor is provided with a peripheral groove having a V-profile for the accommodation of a V-belt.

The end of the stud shaft 2 of reduced diameter carries an anti-friction thrust bearing 17 which is held against a shoulder of the stud shaft 2 by a suitable split ring and is held against relative rotation in the hub member 15 by suitable means, such as split rings engaging internal grooves of the tubular member 15.

The tubular hub member 15 is provided with means for connection with the fan 18. Preferably, these connecting means form a cover closing the end of the tubular hub member 15. For this purpose a circular disc 19 having circumferentially distributed spaced lugs 20 is inserted in the end of the tubular hub member 15 and upon insertion is so turned that the lugs 20 engage behind internal lugs 21 provided in angular spaced relationship on the hub member 15. The disc 19 is provided with three threaded bores for the accommodation of threaded bolts 22 extending through the hub of the fan 18.

Suitable sealing rings 11 and 24 are provided to seal the central apertures of the cover 7 and of the cup-shaped member 6 of the primary rotor.

A scooping member 25, 26 is fixed on the stud shaft 2 and extends outwardly therefrom into the housing 6, 7 adjacent to the secondary rotor 5, the scooping member having at least one mouth 27 spaced from the axis of the stud shaft 2 a distance exceeding the outer radius of the vanes 4 and 14. In the embodiment shown the scooping member 25, 26 is disposed within a gap provided between the co-operating sets of vanes 4 and 14. In the embodiment shown the scooping member comprises a cup-shaped hub 25 and a plurality of radial tubes 26 which communicate with an internal peripheral groove of the hub 25 through suitable ducts. Any desired number of tubes 26 may be provided.

The toroidal chambers accommodating the vanes 4, 9 and 14 communicate with admission and discharge ducts. The stud shaft 2 is provided with internal bores forming part of such ducts. Thus, a bore 32 communicates with the internal groove of the hub 25 of the scooping member and with a port provided in the bracket 3 and communicating in its turn with a return pipe 35 shown in FIG. 2. Therefore, the liquid entering the mouth 27 of the scooping member will be discharged through the discharge duct comprising the tube 26, a duct provided in the hub 25, the internal peripheral groove of the latter, the bore 32 and the return pipe 35. The admission duct includes a bore 28 of the stud 2 and, leaving the end of the stud, enters the chamber 29 adjacent the disc 19 and from there flows through the anti-friction bearings 16 and 17 and into a gap 30 provided between the secondary rotor 5 and the hub 25 of the scooping member. This gap communicates with the toroidal space accommodating the co-operating vanes 4 and 14. Moreover, a bore 31 of the rotor 5 leads from the gap 30 to a gap which is provided between the cup-shaped member 6 and the secondary rotor 5 and communicates with the toroidal chamber accommodating the vanes 9 and 14.

In FIG. 2 the elements just described are shown diagrammatically and the same reference numerals as in FIG. 3 have been applied thereto.

The discharge duct which includes the scooping tube 26, the bore 32 and the pipe 35 must offer a material resistance to the flow of the liquid in order to retain a material volume of liquid in the toroidal chamber in spite of the tendency of the centrifugal force produced by the rotation of the rotors to discharge all of the liquid through the mouth or mouths 27. If desired, the cross-section of the internal passage-way of the scooping member which forms part of the discharge duct may be so restricted as to offer a material resistance to the passage of the liquid. Preferably, however, the discharge duct includes a member constituting a restricted passage-way, such as a nozzle 36 interchangeably inserted in the pipe 35 closely adjacent to the port of the bracket 3 communicating with the bore 32. A plurality of different nozzles 36 differing by their internal diameters may be kept in store for selective insertion.

The admission duct for admitting the liquid to the toroidal chambers of the hydrodynamic clutch includes the bore 28 of the stud shaft 2 and a pipe 37 communicating therewith and leading to a discharge port of a throttling valve 38. The inlet port of this valve communicates with a pipe 39 leading to and communicating with the lubrication pressure pipe L supplied with oil under pressure by the conventional gear pump 40 mounted in the engine for lubrication and supplied with oil from the sump 41 into which the return pipe 35 extends.

The throttling valve 38 comprises a substantially cylindrical housing 42 having an internal shoulder 43 between an upper section of larger internal diameter and a lower section of smaller internal diameter. A conical member 44 is mounted within the cylinder 42 for movement substantially in the direction of the axis thereof so as to co-operate with the shoulder 43 on the internal wall of the cylinder 42 to confine a passage-way of gradually decreasing cross-section. Means are provided for varying such cross-section by axial displacement of the conical member 44. In the embodiment shown such means comprises a thermostat 45 so disposed as to detect the temperature of the element or the medium to be cooled by the fan 18. Where the fan co-operates with a radiator, through which cooling water circulates the thermostat may be mounted within such cooling water circuit.

Preferably the conical member 44 which is connected with the movable stem of the thermostat 45 for adjustment is provided with an axially extending bore 47 directly connecting the inlet port of the housing 38 with the outlet port thereof.

The operation of our novel driving system for driving the fan 18 is as follows:

The pump 40 feeds oil from the sump 41 of the engine into the pipe L leading to the elements of the engine to be lubricated. Part of the oil flows through the pipe 39 to the inlet port of the cylindrical housing 42 and then upwardly and through the restricted annular passage confined by the shoulder 43 and the conical member 44. The oil then leaves the cylindrical housing 42 through the outlet port thereof and enters the pipe 37 being admitted through the bore 28 and the ducts described hereinabove to the toroidal chambers of the clutch. When the engine is running at a low speed driving the primary rotor 6, 7 through the V-belt at a low velocity, the pressure produced in the oil adjacent to the mouth 27 of the scooping member will be comparatively low and, therefore, a small amount of oil per time unit only will be discharged through the discharge duct. Therefore, the toroidal chambers will be kept filled causing the slippage between the primary rotor and the secondary rotor to be negligible. In other words, the secondary rotor connected with the fan 18 will rotate substantially at the same speed as the primary rotor 6, 7. When the engine is accelerated, however, the pressure set up in the oil by the centrifugal force will increase causing a larger quantity of oil to be discharged per time unit, thus reducing the volume of oil retained in the toroidal chambers. Therefore, the slippage will increase accordingly. The reduction of the volume of oil in its turn reduces the pressure set up in the oil thereby reducing the volume of oil discharged per time unit until the balance between the admission of oil and the discharge of oil is restored.

When the temperature to which the thermostat 45 responds rises, the conical member 44 will be moved in a direction away from the thermostat 45 thereby increasing the width of the annular gap between the shoulder 43 and the conical member 44 and consequently increasing the admission of oil to the coupling. This will increase the rotary speed of the fan 18 accordingly. FIG. 1 illustrates the dependency of the speed of the fan from the speed of the engine. When the temperature of the cooling water is low, the speed of the fan increases in proportion to the speed of the engine when the latter is started up to the point 5 of the characteristic. When the speed of the engine increases further, so much oil is discharged from the toroidal chambers of the coupling increasing the slippage that the speed of the fan increases but slowly up to the point 6 and thereafter may even drop. When the temperature of the cooling water is higher the point 5 may move to 5' or even 5" and the point 6 will then move to 6' or 6".

The fact that the scooping mouth 27 is spaced from the axis of rotation a distance exceeding the maximum radius of the vanes has the effect that a powerful discharge pressure is ensured even with a very small volume of oil left in the toroidal chambers. The bore 47 of the conical member 44 ensures that some oil will be always supplied to the hydrodynamic coupling for lubrication purposes even if the thermostat under the effect of a very low tempeature should close the gap between the shoulder 43 and the conical member 44 altogether.

The assembly of the coupling is quite simple. The individual elements are placed upon the stud shaft 2 successively and are fixed in place. Finally the disc 19 is assembled in the manner described and is fixed by tightening the bolts 22. First the cover 7 is mounted on the stud shaft 2 and held thereon by the bearing 10. Thereafter the scooping member 25, 26, the secondary rotor with its bearings 16 and 17 and finally the cup-shaped rotor member 6 are assembled, the latter being fixed in position on the cover plate 7 by the split ring 12. Ultimately, the plate 19 is inserted into the front end of the tubular hub member 15 and the fan 18 is secured thereto by three bolted screws 22. Hence, it will appear that the number of threaded elements is a minimum. Also the faces to be machined have been reduced to a minimum.

Owing to this simple compact design of the coupling, it is possible to produce and assemble same in a very economical manner. Moreover, the automatic control of the coupling by the scooping member and the throttling elements 36 and 38 ensures that the fan always will be driven at a speed necessary to comply with the cooling requirements arising under any conditions of rotary speed or temperature. The thermostat 45 need not be very accurate and it is not necessary that it responds without delay.

The embodiment described is capable of numerous modifications. Thus, each of the rotors may be provided with a single set of vanes, if desired.

The pipe 35 may extend to the elements of the engine to be lubricated in lieu of the pipe L. In other words, the hydrodynamic coupling may be arranged in series with the elements to be lubricated.

From the above explanation of the operation of our novel driving system it appears that when the speed of the engine exceeds a certain limit which depends upon the temperature of the cooling medium the primary rotor drivingly connected to the engine by the V-belt will overtake the secondary rotor connected with the fan with an increasing slippage permitting the fan on further acceleration of the engine to retain its speed or to even reduce its speed. This is highly desirable in order to avoid a noisy operation of the fan and an undue power consumption thereby. Experience has shown that the quantity of cooling air propelled by the fan will be amply sufficient for cooling purposes, because the effect of the fan is supplemented by the wind, where the engine is mounted on a motor vehicle. Under conditions, however, requiring the propulsion of a larger amount of cooling air, for instance when the motor car is driven up hill over a considerable distance, the thermostat will so control the admission of liquid to the clutch that the same will be operated at a higher speed. Therefore, it is possible to employ a large fan 18 without risking an undue loss of power by operating the fan.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. A hydrodynamic coupling for drivingly connecting an internal combustion engine with a cooling fan comprising a stud shaft, means providing a stationary mounting for said stud shaft, a primary rotor and a secondary rotor mounted on said stud shaft, said primary rotor forming a housing enclosing said secondary rotor, means defining spaces between said rotors, said means comprising mutually cooperating pairs of sets of vanes, a scooping member fixedly secured to said stud shaft and extending into one of said spaces, means for supplying liquid to said spaces including a reservoir spaced from said coupling, and continuous passage means accommodating a continuous flow of said liquid through said coupling from and to said reservoir, said continuous passage means including admission means and a pump connecting said reservoir and said coupling, said continuous passage means further including discharge means comprising said scooping member and duct means, said scooping member including liquid passage means in communication at one end thereof with said one of said spaces and at the other end thereof with said duct means, said duct means affording a continuous passage for said liquid from said scooping member to said reservoir, said admission means including means for varying the supply of said liquid to said spaces, said means for varying the supply of said liquid to said spaces comprising a throttling valve and means including a thermostat for controlling said valve, said thermostat being responsive to a temperature condition of the cooling system of said engine.

2. A hydrodynamic coupling according to claim 1, wherein said throttling valve includes a passage-way for said liquid including a shoulder and a conical member operatively connected to said thermostat and mounted in said passage-way for movement relative to said shoulder in the direction of the axis of said passage-way.

3. A hydrodynamic coupling according to claim 1, wherein said housing formed by said primary rotor constitutes a sheave driven by said engine, said secondary rotor having a driving connection with said fan.

4. A hydrodynamic coupling according to claim 1, wherein said duct means includes an exchangeable member constituting a restricted passage-way offering substantial resistance to the flow of said liquid.

References Cited in the file of this patent

UNITED STATES PATENTS

| | | |
|---|---|---|
| 1,389,562 | Schneider | Aug. 30, 1921 |
| 1,766,520 | Klimek | June 24, 1930 |
| 2,223,715 | Berger | Dec. 3, 1940 |
| 2,289,440 | Kugel | July 14, 1942 |
| 2,322,577 | Kuhns et al. | June 22, 1943 |
| 2,436,034 | Buehler | Feb. 17, 1948 |
| 2,631,432 | Newcomb | Mar. 17, 1953 |
| 2,633,697 | Johnson | Apr. 7, 1953 |
| 2,673,450 | Wolf | Mar. 30, 1954 |
| 2,768,501 | Muller | Oct. 30, 1956 |

FOREIGN PATENTS

| | | |
|---|---|---|
| 1,139,035 | France | Feb. 4, 1957 |
| 581,185 | Germany | July 22, 1933 |
| 765,668 | Great Britain | Jan. 9, 1957 |